(12) United States Patent
Kim et al.

(10) Patent No.: US 10,048,523 B2
(45) Date of Patent: Aug. 14, 2018

(54) METHOD OF ETCHING DISPLAY PANEL FOR MANUFACTURING CURVED DISPLAY DEVICE

(71) Applicant: TOVIS CO., LTD., Incheon (KR)

(72) Inventors: Hwan Jin Kim, Gwangmyeong-si (KR); Gi Yun Eom, Incheon (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 15/536,665

(22) PCT Filed: Dec. 24, 2014

(86) PCT No.: PCT/KR2014/012798
§ 371 (c)(1),
(2) Date: Jun. 16, 2017

(87) PCT Pub. No.: WO2016/104826
PCT Pub. Date: Jun. 30, 2016

(65) Prior Publication Data
US 2017/0351135 A1    Dec. 7, 2017

(30) Foreign Application Priority Data

Dec. 22, 2014  (KR) .................. 10-2014-0185812

(51) Int. Cl.
*G02F 1/1333* (2006.01)
*B32B 38/10* (2006.01)
(Continued)

(52) U.S. Cl.
CPC ........ *G02F 1/133305* (2013.01); *B32B 38/10* (2013.01); *C03B 23/023* (2013.01);
(Continued)

(58) Field of Classification Search
None
See application file for complete search history.

(56) References Cited

U.S. PATENT DOCUMENTS

| | | | |
|---|---|---|---|
| 7,799,699 B2* | 9/2010 | Nuzzo | H01L 29/72 |
| | | | 101/353 |
| 2008/0047930 A1* | 2/2008 | Blanchet | B82Y 10/00 |
| | | | 216/41 |
| 2015/0198838 A1* | 7/2015 | Bornstein | C03C 15/00 |
| | | | 216/24 |

FOREIGN PATENT DOCUMENTS

| | | | |
|---|---|---|---|
| JP | 2008-084917 | * | 4/2008 |
| JP | 2008-084917 A | | 4/2008 |

(Continued)

OTHER PUBLICATIONS

International Search Report for PCT/KR2014/012798 dated Aug. 21, 2015 from Korean Intellectual Property Office.

*Primary Examiner* — Ashok Patel
(74) *Attorney, Agent, or Firm* — Revolution IP, PLLC

(57) ABSTRACT

A method of etching a display panel for manufacturing a curved display device comprises the steps of: applying a masking ink in a manner of immersing a non-etched portion of a display panel into an ink reservoir, which contains the masking ink, in order to protrude the non-etched portion from the display panel; curing the masking ink coated on the non-etched portion of the display panel; etching the display panel to reduce the thickness of the display panel by coating an etching liquid onto the display panel on which the masking ink is cured; and removing the masking ink from the etched display panel with a solvent, which dissolves the masking ink.

9 Claims, 4 Drawing Sheets

(51) Int. Cl.
 *C03C 15/00* (2006.01)
 *C03B 23/023* (2006.01)
(52) U.S. Cl.
 CPC ........ *C03C 15/00* (2013.01); *B32B 2457/202* (2013.01); *G02F 2201/46* (2013.01)

(56) References Cited

FOREIGN PATENT DOCUMENTS

| | | | |
|---|---|---|---|
| JP | 2014-044501 | A | 3/2014 |
| KR | 10-2009-0042848 | A | 4/2009 |
| KR | 10-2009-0123848 | A | 12/2009 |
| KR | 10-2014-0036378 | A | 3/2014 |
| KR | 10-1468455 | A | 12/2014 |

\* cited by examiner

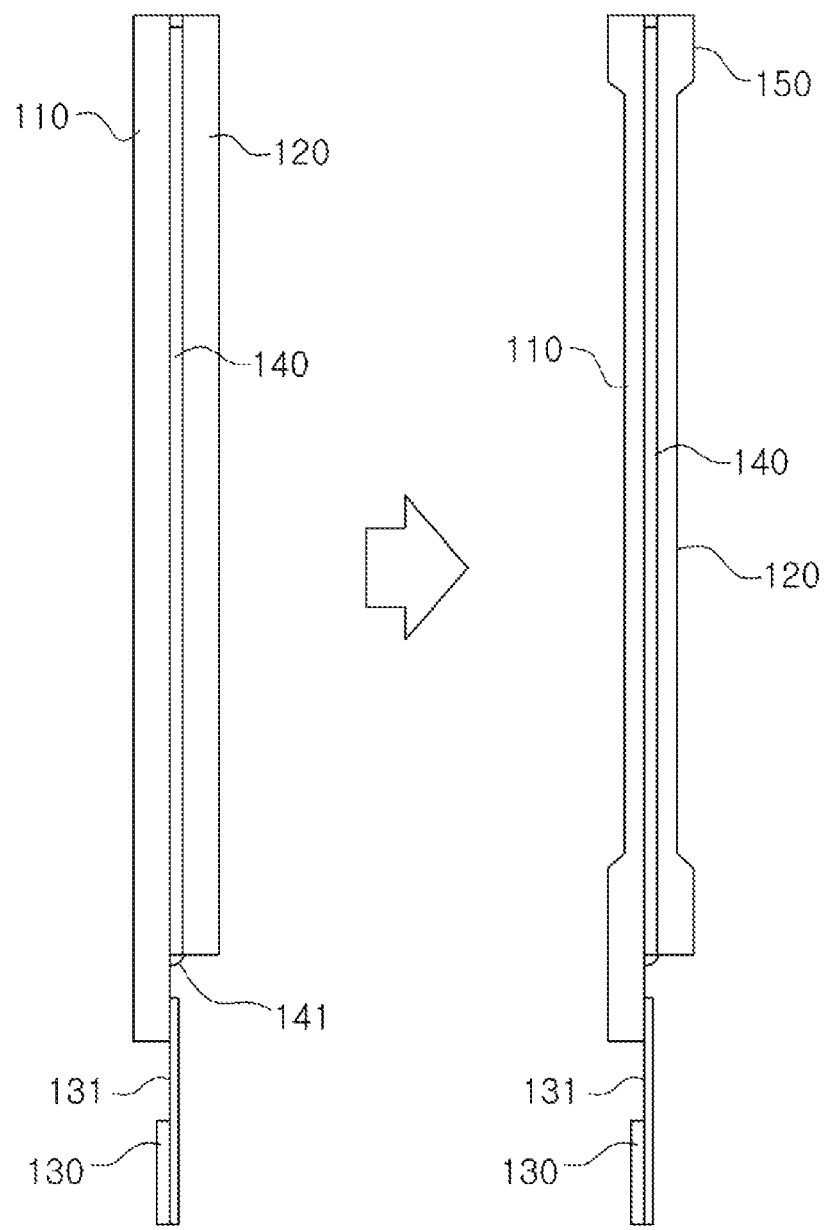

[FIG. 2]
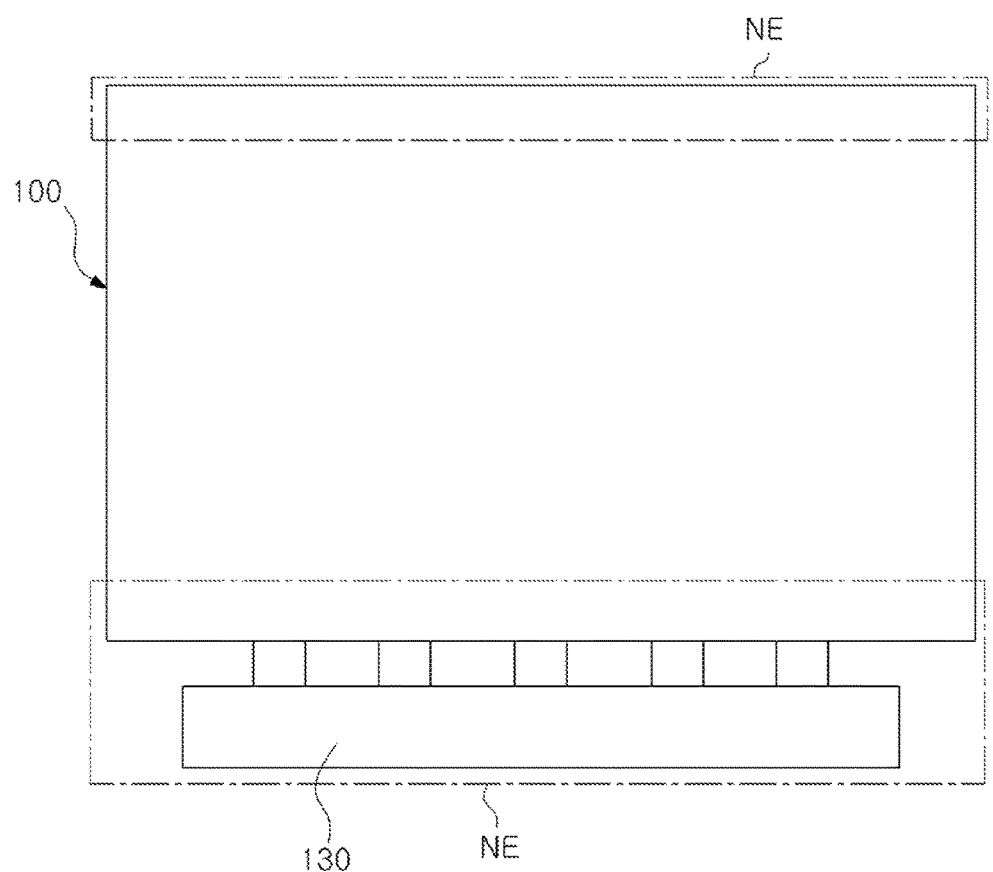

[FIG. 3]
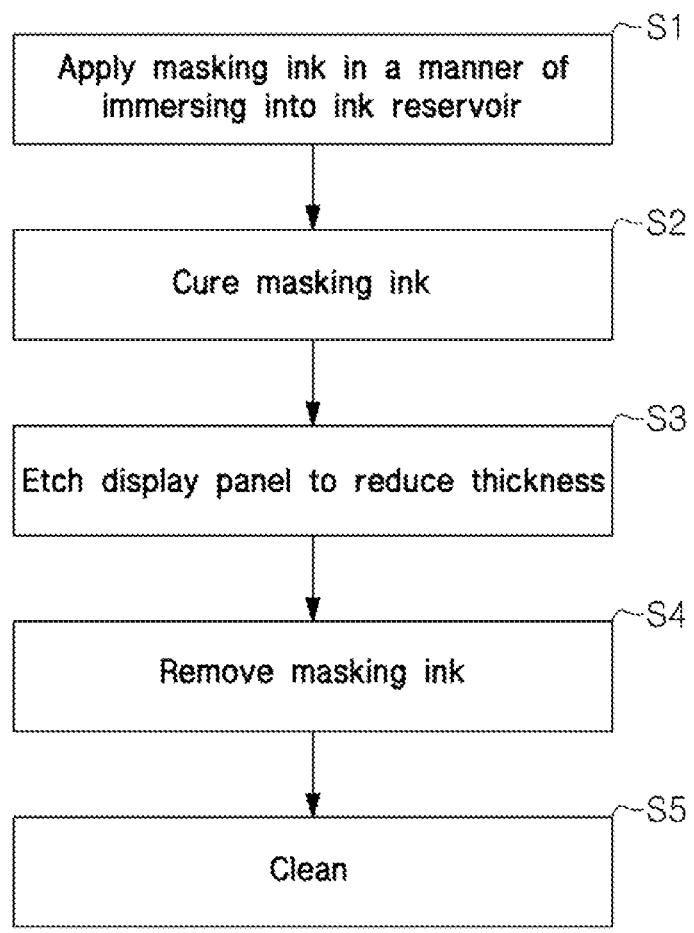

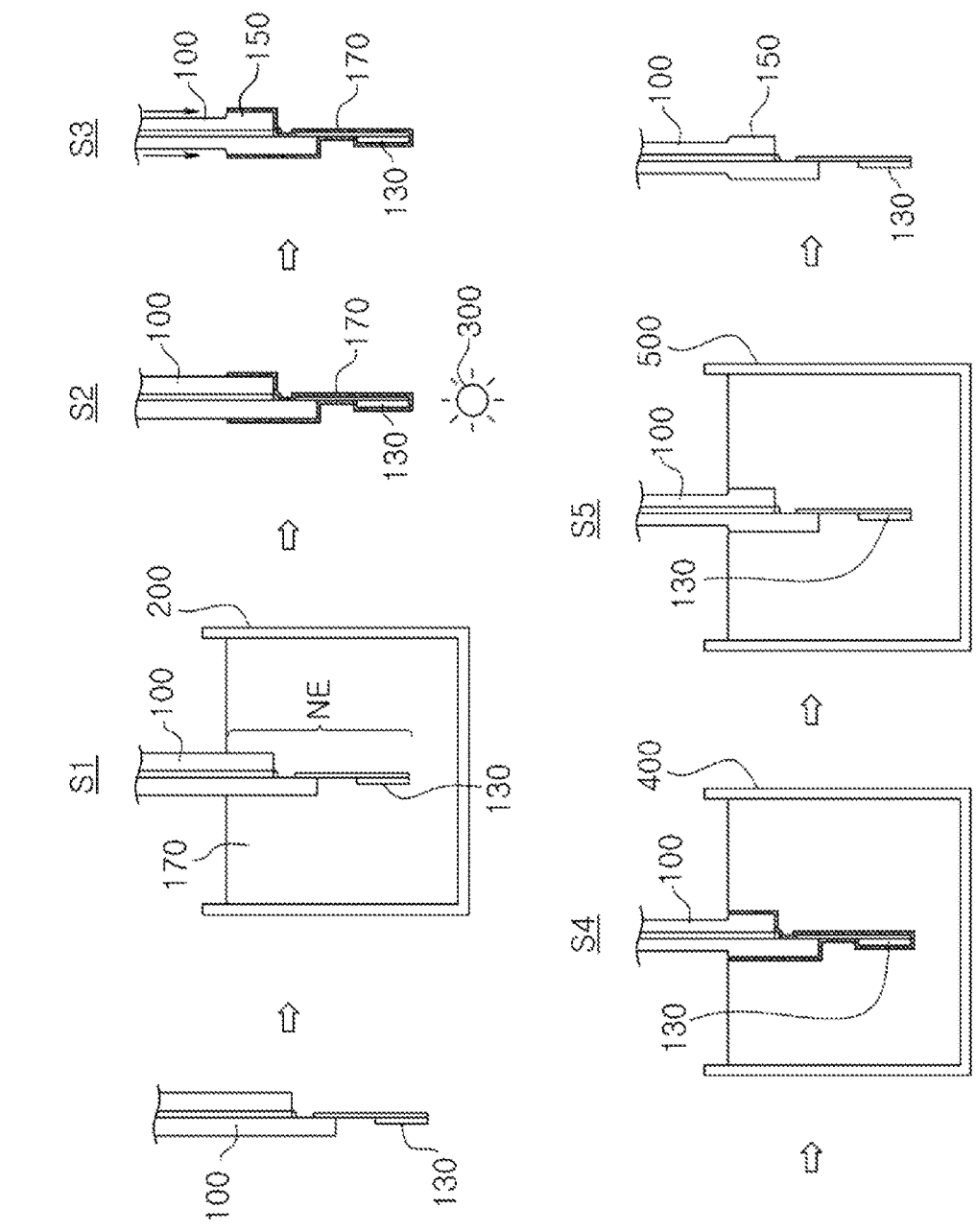
[FIG. 4]

METHOD OF ETCHING DISPLAY PANEL FOR MANUFACTURING CURVED DISPLAY DEVICE

CROSS REFERENCE TO PRIOR APPLICATIONS

This application is a National Stage Application of PCT International Patent Application No. PCT/KR2014/012798 filed on Dec. 24, 2014, under 35 U.S.C. § 371, which claims priority to Korean Patent Application No. 10-2014-0185812 filed on Dec. 22, 2014, which are all hereby incorporated by reference in their entirety.

TECHNICAL FIELD

The present invention relates to a method of etching a display panel for manufacturing a curved display device, and more particularly, to a method of etching a display panel to reduce the thickness of the display panel in such a manner that a flat type display panel is easily bent so as to manufacture a curved display device.

BACKGROUND ART

In general, a display panel is a panel for displaying images. Recently, with development of technologies, curved display devices for enlarging a sense of immersion have been disclosed.

Such a curved display device having a curved surface, on which images are shown, provides users with immersion because the users can feel like they are in the images. A general curved display device has a thin display panel so that the display panel can be easily curved.

In order to make the display panel thin, the display panel is designed to be thin when it is first manufactured, but in the case of a prebuilt flat display panel, the display panel is etched to be made thin.

Korean Patent No. 10-1468455 published on Dec. 4, 2014 discloses an etching method for manufacturing thin display panel with a curved surface.

The conventional etching method for manufacturing a curved display panel by etching flat surfaces of first and second substrates between which a liquid crystal layer is formed, includes a protective layer forming step of forming a protective layer on the liquid crystal layer in a state where an actuation circuit unit having a printed circuit board (PCB) is combined to a display panel unit; a masking step of masking non-etched portions of top portions and both side portions of the first and second substrates and the actuation circuit unit; a substrate fixing step of vertically fixing the display panel on a substrate stand in a state where the masking part of the actuation circuit unit is supported; and an etching step of etching an etching portion of the flat surfaces of the first and second substrates. Therefore, the conventional etching method can make the prebuilt flat display panel thin.

However, such a conventional etching method has a disadvantage in that it takes a long time to mask because a protection tape is wound several times to mask the actuation circuit unit and the non-etched portions.

Moreover, the conventional etching method has another disadvantage in that it is somewhat difficult to mask even the actuation circuit unit having a complicated shape with the masking tape.

Furthermore, the conventional etching method has a further disadvantage in that an etching failure rate is high because an etching liquid permeates due to a poor adhesion of the masking tape.

DISCLOSURE

Technical Problem

Accordingly, the present invention has been made in view of the above-mentioned problems occurring in the prior art, and it is an object of the present invention to provide a method of etching a display panel for manufacturing a curved display device, which can reduce time required for etching to reduce time for masking, rapidly mask to an area having a complicated shape, and prevent etching failure caused by permeation of an etching liquid because a non-etched portion is finished perfectly.

Technical Solution

To accomplish the above object, according to the present invention, there is provided a method of etching a display panel for manufacturing a curved display device including the steps of: applying a masking ink in a manner of immersing a non-etched portion of a display panel into an ink reservoir, which contains the masking ink, in order to protrude the non-etched portion from the display panel; curing the masking ink coated on the non-etched portion of the display panel; etching the display panel to reduce the thickness of the display panel by coating an etching liquid onto the display panel on which the masking ink is cured; and removing the masking ink from the etched display panel with a solvent, which dissolves the masking ink.

In the step of removing the masking ink, the solvent removes the masking ink in the manner of immersing the non-etched portion, which is coated with the masking ink, in a solvent reservoir.

After the step of removing the masking ink with a solvent, which dissolves the masking ink, the etching method further includes the step of cleaning the display panel in order to remove the solvent.

The step of cleaning the display panel comprises the step of cleaning the display panel with de-ionized water.

The step of cleaning the display panel comprises the step of cleaning the display panel by spraying hot air to the display panel.

The step of applying the masking ink and the step of curing the masking ink are carried out repeatedly at each non-etched portion when there are many non-etched portions on the display panel.

The masking ink may be ultraviolet curing ink which is cured by ultraviolet rays.

In the step of applying the masking ink, when an actuation circuit board for actuating the display panel is mounted on the non-etched portion, the display panel together with the actuation circuit board is immersed into the ink reservoir to be coated with the masking ink.

The non-etched portion is the whole or some of edges of the display panel.

Advantageous Effects

As described above, the method of etching the display panel for manufacturing the curved display device according to the preferred embodiment of the present invention can reduce time required for etching because it can easily coat the masking ink on the part having a complicated shape like the actuation circuit board and reduce time for coating the masking ink by coating the display panel with the masking ink in the manner of immersing the non-etched portion of the display panel in the ink reservoir containing the masking ink.

Moreover, the method of etching the display panel for manufacturing the curved display device according to the preferred embodiment of the present invention can prevent etching failure due to permeation of the etching liquid because the masking ink 170 is perfectly coated on the non-etched portion by coating the display panel with the masking ink in the manner of immersing the non-etched portion of the display panel in the ink reservoir containing the masking ink.

Furthermore, the method of etching the display panel for manufacturing the curved display device according to the preferred embodiment of the present invention can perform masking by curing the masking ink in the manner of radiating ultraviolet rays because ultraviolet curing ink is used as the masking ink.

Additionally, the method of etching the display panel for manufacturing the curved display device according to the preferred embodiment of the present invention can rapidly remove the masking ink by rapidly removing all of residues because the masking ink is removed by the solvent.

In addition, the method of etching the display panel for manufacturing the curved display device according to the preferred embodiment of the present invention can prevent corrosion by the solvent because the display panel is cleaned after the masking ink is removed.

DESCRIPTION OF DRAWINGS

FIG. 1 is a side sectional view showing a display panel before etching and a display panel after etching through a method of etching a display panel for manufacturing a curved display device according to a preferred embodiment of the present invention.

FIG. 2 is a front view showing a non-etched portion of the display panel for etching through the method of etching the display panel according to the preferred embodiment of the present invention.

FIG. 3 is a rough flow chart of the display panel for etching through the method of etching the display panel for manufacturing a curved display device according to the preferred embodiment of the present invention.

FIG. 4 is a roughly schematized diagram showing a flow of the method of etching the display panel for manufacturing a curved display device according to the preferred embodiment of the present invention.

[Explanation of Reference Numerals]

| | |
|---|---|
| 100: Display panel | 110: First substrate |
| 120: Second substrate | 130: Actuation circuit board |
| 131: Flexible cable | 150: Protrusion part |
| 140: Liquid crystal layer | 141: Sealer |
| 170: Masking ink | 200: Ink reservoir |
| 300: Ultraviolet lamp | 400: Solvent reservoir |
| 500: Cleaning tank | NE: Non-etched portion |

MODE FOR INVENTION

Hereinafter, reference will be now made in detail to the preferred embodiment of the present invention with reference to the attached drawings.

First, the present invention relates to a method of etching a display panel for manufacturing a curved display device by bending a flat display panel 100 to make the display panel 100 thin.

As shown in FIG. 1, the display panel 100 may be an LCD panel including a first substrate 110 and a second substrate 120, and a liquid crystal layer 140 located between the first substrate 110 and the second substrate 120. In the case that one of the first substrate 110 and the second substrate 120 is a color filter substrate, the other one may be a thin film transistor substrate, and the liquid crystal layer 140 may be a polymer liquid crystal layer 140.

Moreover, the display panel 100 may include an actuation circuit board 130 for actuating the display panel 100, and the actuation circuit board 130 has various semiconductors and electric elements, includes a flexible cable 131, and is bonded to the display panel 100. In this instance, the actuation circuit board 130 may be a flexible printed circuit board (FPCB).

Additionally, a sealer 141 for protecting the liquid crystal layer 140 may be mounted at the periphery of the display panel 100.

As shown in FIGS. 3 and 4, the method of etching a display panel for manufacturing a curved display device according to the preferred embodiment of the present invention may first include a step (S1) of applying a masking ink 170.

The step (S1) of applying the masking ink 170 is to coat the masking ink 170 on a non-etched portion (NE) in order to form a protrusion part 150, which protrudes without etching, on the display panel 100.

First, the front surface and the rear surface of the display panel 100 are wholly etched to reduce the thickness of the display panel 100, such that the display panel 100 can be bent easily to manufacture a curved display device. In this instance, in order to prevent reduction in thickness of the non-etched portion (NE), in other words, in order to make the non-etched portion (NE) the protrusion part 150 for reinforcing stiffness by protruding more than the etched portion without reduction of the thickness, the masking ink 170 may be coated on the non-etched portion (NE).

Here, as shown in FIG. 2, the non-etched portion (NE) of the display panel 100, on which the masking ink 170 is coated, may be the whole edges of the front surface and the rear surface of the display panel 100, or some of the edges of the front surface and the rear surface, for instance, edges of upper and lower sides of the display panel 100, or edges of right and left sides, or an edge of one of the upper, lower, right and left sides.

Moreover, if the actuation circuit board 130 is attached to the edge portion, which is the non-etched portion (NE) of the display panel 100, not only the non-etched portion (NE) but also the actuation circuit board 130 may be coated with the masking ink 170.

In the meantime, in order to coat the display panel 100 with the masking ink 170, the non-etched portion (NE) of the display panel 100 is immersed in an ink reservoir 200 filled with the masking ink 170.

In this instance, if the masking ink 170 is coated by being transferred through a general inkjet printer type or a silk screen printing type, because a nozzle for coating ink is required or there is a need to scrape off the ink, a coating thickness of the masking ink 170 may get thinner.

However, if the coating thickness of the masking ink 170 becomes thin, an etching liquid may permeate due to generation of cracks when the masking ink 170 is cured, and it may cause etching failure.

Furthermore, when the masking ink 170 is coated by the inkjet printer type or the silk screen printing type, it is difficult to coat the masking ink 170 on the edge portion to which the actuation circuit board 130 with a complicated shape is attached.

However, as described in this preferred embodiment, when the display panel 100 is immersed in the masking ink 170 to coat the display panel 100 with the masking ink 170, the edge portion to which the actuation circuit board 130 with a complicated shape is attached may be easily coated with the masking ink 170 by being immersed in the ink reservoir 200.

Ink is generally coated by the inkjet printer type or the screen printing type, but in this instance, the coating thickness of the ink is limited because ink is sprayed from a nozzle or scraped off from a screen. However, when the display panel 100 is coated with the masking ink 170 by being immersed into the ink reservoir 200 as described in this embodiment, the preferred embodiment of the present invention may have a coating thickness thicker than the general coating methods, that is, the masking ink 170 may be coated to be at least 8 um thick.

Therefore, when the masking ink 170 is cured, it is prevented that cracks of the masking ink 170 are generated and the masking ink 170 peels off easily.

Additionally, if masking is carried out in such a way that the display panel 100 is immersed in the masking ink 170, because the masking ink 170 has viscosity, the masking ink can be coated on the display panel in an accurately straight line with the surface of the ink contained in the ink reservoir 200.

As described above, when the display panel 100 is coated with the masking ink 170 by being immersed in the ink reservoir 200, it is prevented that the non-etched portion (NE) of the display panel 100 is masked unevenly.

In addition, because masking can be carried out rapidly in such a way that the display panel 100 is immersed into the ink reservoir 200 and taken out and the immersed part of the display panel 200, which is immersed in the ink reservoir 200, is perfectly coated with the masking ink 170, it can prevent etching failure due to permeation of the etching liquid.

Moreover, if there is a portion that is not coated with the masking ink or the masking ink 170 is coated unevenly, the part to be masked can be easily corrected in such a way as to recoat the portion with the masking ink 170, and the part to be masked can be freely corrected by removing the masking ink 170 by a solvent.

In the meantime, when the display panel 100 is coated with the masking ink 170, the masking ink 170 is recoated to cover an upper portion of the sealer 141, which is located not on the non-etched portion (NE) but on the etched portion, or only the part on which the sealer 141 is located is immersed in the ink reservoir 200 so as to prevent corrosion of the sealer 141 by the etching liquid during etching.

As shown in FIGS. 3 and 4, the method of etching the display panel for manufacturing the curved display device according to the preferred embodiment of the present invention may include a step (S2) of curing the masking ink 170 coated on the non-etched portion (NE) of the display panel 100.

The step (S2) of curing the masking ink 170 is to cure the masking ink 170 of a liquid state so as to be fixed on the display panel 100.

Here, because the masking ink 170 is in a liquid state, it may run down easily when being moved, so may infiltrate the etched portion of the display panel 100.

As described above, the masking ink 170 of the liquid state is cured in a proper way according to kinds of the ink not to run down.

For instance, if the masking ink 170 is a thermosetting ink, the masking ink 170 is cured by application of heat. If the masking ink 170 is an UV curing ink, the masking ink 170 is cured in such a way that an ultraviolet lamp 300 radiates ultraviolet rays to the masking ink 170.

Meanwhile, the step of curing the masking ink 170 may be carried out immediately after the masking ink 170 is taken off from the ink reservoir 200.

Furthermore, if there are several non-etched portions (NE) formed on the display panel 100, the step of coating the masking ink 170 and the step of curing the masking ink 180 may be carried out repeatedly at each non-etched portion.

For instance, if the edges of the upper and lower sides of the display panel 100 are non-etched portions, the lower edge portion of the display panel 100 is immersed in the ink reservoir 200 to be coated with the masking ink 170, and then, is cured. After that, the display panel 100 is turned upside down, and the edge portion of the upper side is immersed in the ink reservoir 200 to be coated with the masking ink 170, and then, is cured. Through the above steps, coating and curing of the masking ink 170 can be carried out repeatedly.

As shown in FIGS. 3 and 4, the method of etching the display panel for manufacturing the curved display device according to the preferred embodiment of the present invention may include a step (S3) of coating the etching liquid on the display panel 100, on which the masking ink 170 is cured, such that the display panel 100 is etched to be reduced in thickness.

In the step (S3) of etching the display panel 100 to be reduced in thickness, etching is carried out by the etching liquid coated on the whole surface of the front and rear sides of the display panel 100, such that the display panel 100 is curved easily.

In this instance, the etching liquid may be coated on the display panel 100 in such a way as to run down from the upper side to the lower side of the display panel 100 in a state where the display panel 100 stands up, or in such a way that the etching liquid is sprayed onto both sides of the display panel 100.

Here, to coat the etching liquid on the display panel 100 for etching the display panel 100 means that the etching liquid is continuously sprayed or supplied to run down in order to etch the display panel 100 to a predetermined thickness.

In the meantime, if the etching liquid is coated on the whole surface of the display panel 100 in order to reduce the thickness of the display panel 100, etching is carried out in such a way that only the etched portion of the display panel 100, which is not coated with the masking ink 170, is etched by a chemical reaction and the non-etched portion (NE), which is coated with the masking ink 170, is not etched because there is no chemical reaction.

As described above, when etching is carried out, the whole surfaces of the front and rear sides of the display panel 100, which are the etched portions, are etched so as to be reduced in thickness, and at the same time, the non-etched portion (NE) is not etched due to the masking ink 170 and forms a protrusion part 150, which relatively protrudes from the display panel 100.

As shown in FIGS. 3 and 4, the method of etching the display panel for manufacturing the curved display device according to the preferred embodiment of the present invention may include a step (S4) of removing the masking ink 170.

The step (S4) of removing the masking ink 170 is to remove the masking ink 170 from the display panel 100 using the solvent, which is soluble the masking ink 170.

In the meantime, the step (S4) of removing the masking ink 170 can remove the masking ink 170 in such a way that the cured part of the masking ink 170 is immersed in a solvent reservoir 400, which is filled with the solvent for dissolving the masking ink 170, for a predetermined period of time so that the masking ink 170 is dissolved.

In this instance, in the case that the masking ink 170 is ultraviolet curing ink, the solvent may be sodium hydroxide, not the whole display panel 100 but the part which is coated with the masking ink 170 is only immersed in the solvent reservoir 400.

Here, it is the best way to remove the masking ink 170 by immersing the masking ink 170 in the solvent reservoir 400. However, besides the above, the masking ink 170 may be removed in such a way that the solvent is sprayed to the part coated with the masking ink 170 or the part coated with the masking ink 170 is wiped off with the solvent.

As described above, according to the preferred embodiment of the present invention, because the masking ink 170 is immersed in the solvent reservoir 400 to be removed, it can be removed cleanly without any residue of an adhesive agent formed by the conventional masking tape.

As shown in FIGS. 3 and 4, the method of etching the display panel for manufacturing the curved display device according to the preferred embodiment of the present invention may include a step (S5) of cleaning.

The cleaning step (S5) is to remove foreign matters attached to the display panel 100 during the process of preventing corrosion by the solvent and other various processes.

For instance, because general solvents are acid, when the actuation circuit board 130 gets in contact with the solvent, it may be corroded.

In order to prevent corrosion, cleaning may be performed to remove the solvent stained on the display panel 100 immediately after the masking ink 170 is removed.

In the meantime, cleaning may be performed in such a way that the display panel 100, from which the masking ink 170 is removed in the solvent reservoir 400, is immersed in a cleaning tank 500 to be cleaned. In this instance, water may be de-ionized water.

Moreover, after the display panel 100 is cleaned by water, hot air is sprayed toward the display panel 100, such that the display panel 100 can be cleaned in a manner of evaporating the used water or the remaining solvent and drying the display panel 100 by heat and of blowing the used water or the remaining solvent away by wind.

Here, in the cleaning step (S5), both or one of the method of cleaning the display panel 100 in the cleaning tank 500 and the method of cleaning the display panel 100 by hot air may be adopted.

Through a series of the above steps, the thickness of the display panel 100 is reduced, and at the same time, the display panel 100 is etched so as to form the protrusion part 150 at the edge portion.

Meanwhile, the display panel 100 etched through the method of etching the display panel for manufacturing the curved display device according to the preferred embodiment of the present invention may be curved to have a desirable curve when a user grasps the protrusion part 150 and a curve maintaining member is attached to maintain the curved form of the curved display panel 100 or when the display panel 100 is put in a previously curved case to be curved, such that a curved display device can be manufactured.

Therefore, the method of etching the display panel for manufacturing the curved display device according to the preferred embodiment of the present invention can remove inconvenience that a masking member is attached to the non-etched portion (NE) because the non-etched portion (NE) is coated with the masking ink 170 in the manner of immersing the non-etched portion (NE) in the ink reservoir 200 containing the masking ink 170. Furthermore, the method of etching the display panel for manufacturing the curved display device according to the preferred embodiment of the present invention can reduce time required for etching because masking is rapidly and easily performed to the part having the complicated shape, which will be coated with the masking ink 170, like the actuation circuit board 130.

Additionally, the method of etching the display panel for manufacturing the curved display device according to the preferred embodiment of the present invention can prevent etching failure due to permeation of the etching liquid because the masking ink 170 is perfectly coated on the non-etched portion.

Moreover, the method of etching the display panel for manufacturing the curved display device according to the preferred embodiment of the present invention can prevent damage of the display panel 100 when the display panel 100 is curved because the display panel 100 is etched in such a way that the non-etched portion (NE) of the display panel 100 protrudes out.

Furthermore, the method of etching the display panel for manufacturing the curved display device according to the preferred embodiment of the present invention can rapidly cure the masking ink 170 by radiating ultraviolet rays because ultraviolet curing ink is used as the masking ink 170.

Additionally, the method of etching the display panel for manufacturing the curved display device according to the preferred embodiment of the present invention can rapidly remove the masking ink 170 without any residue caused by masking because the masking ink 170 is removed by the solvent.

In addition, the method of etching the display panel for manufacturing the curved display device according to the preferred embodiment of the present invention can prevent corrosion by the solvent because the display panel 100 is cleaned after the masking ink 170 is removed.

As described above, while the present invention has been particularly shown and described with reference to the exemplary embodiment thereof, it will be understood by those of ordinary skill in the art that the protective scope of the present invention is not limited to the above embodiment and various changes, modifications and equivalences may be made therein without departing from the technical idea of the present invention.

INDUSTRIAL APPLICABILITY

The method of etching the display panel for manufacturing the curved display device according to the preferred embodiment of the present invention is applicable to industry fields requiring wet etching of flat type boards to be etched, such as glass plates, substrates, display panels, and so on.

The invention claimed is:

1. A method of etching a display panel for manufacturing a curved display device comprising the steps of:
    applying a masking ink in a manner of immersing a non-etched portion of a display panel into an ink reservoir, which contains the masking ink, in order to protrude the non-etched portion from the display panel, wherein the display panel includes an actuation circuit board being mounted on the non-etched portion of the display panel, the display panel together with the actuation circuit board is immersed into the ink reservoir to be coated with the masking ink;
    curing the masking ink coated on the non-etched portion of the display panel;
    etching the display panel to reduce the thickness of the display panel by coating an etching liquid onto the display panel on which the masking ink is cured; and
    removing the masking ink from the etched display panel with a solvent, which dissolves the masking ink.

2. The etching method according to claim 1, wherein in the step of removing the masking ink, the solvent removes the masking ink in the manner of immersing the non-etched portion, which is coated with the masking ink, in a solvent reservoir.

3. The etching method according to claim 1, after the step of removing the masking ink, further comprising the step of:
    cleaning the display panel in order to remove the solvent.

4. The etching method according to claim 3, wherein the step of cleaning the display panel comprises the step of cleaning the display panel with de-ionized water.

5. The etching method according to claim 3, wherein the step of cleaning the display panel comprises the step of cleaning the display panel by spraying hot air to the display panel.

6. The etching method according to claim 1, wherein the step of applying the masking ink and the step of curing the masking ink are carried out repeatedly at each non-etched portion when there are many non-etched portions on the display panel.

7. The etching method according to claim 1, wherein the masking ink is ultraviolet curing ink which is cured by ultraviolet rays.

8. The etching method according to claim 1, wherein the non-etched portion is the whole or some of edges of the display panel.

9. A curved display device manufactured by the method of etching a display panel described in claim 1, wherein the display panel is bent to provide a curved shape to the display panel.

* * * * *